June 2, 1953
A. E. C. BENNETT
2,640,940
HIGH-FREQUENCY ELECTRIC POTENTIAL DIVIDER
Filed March 12, 1952
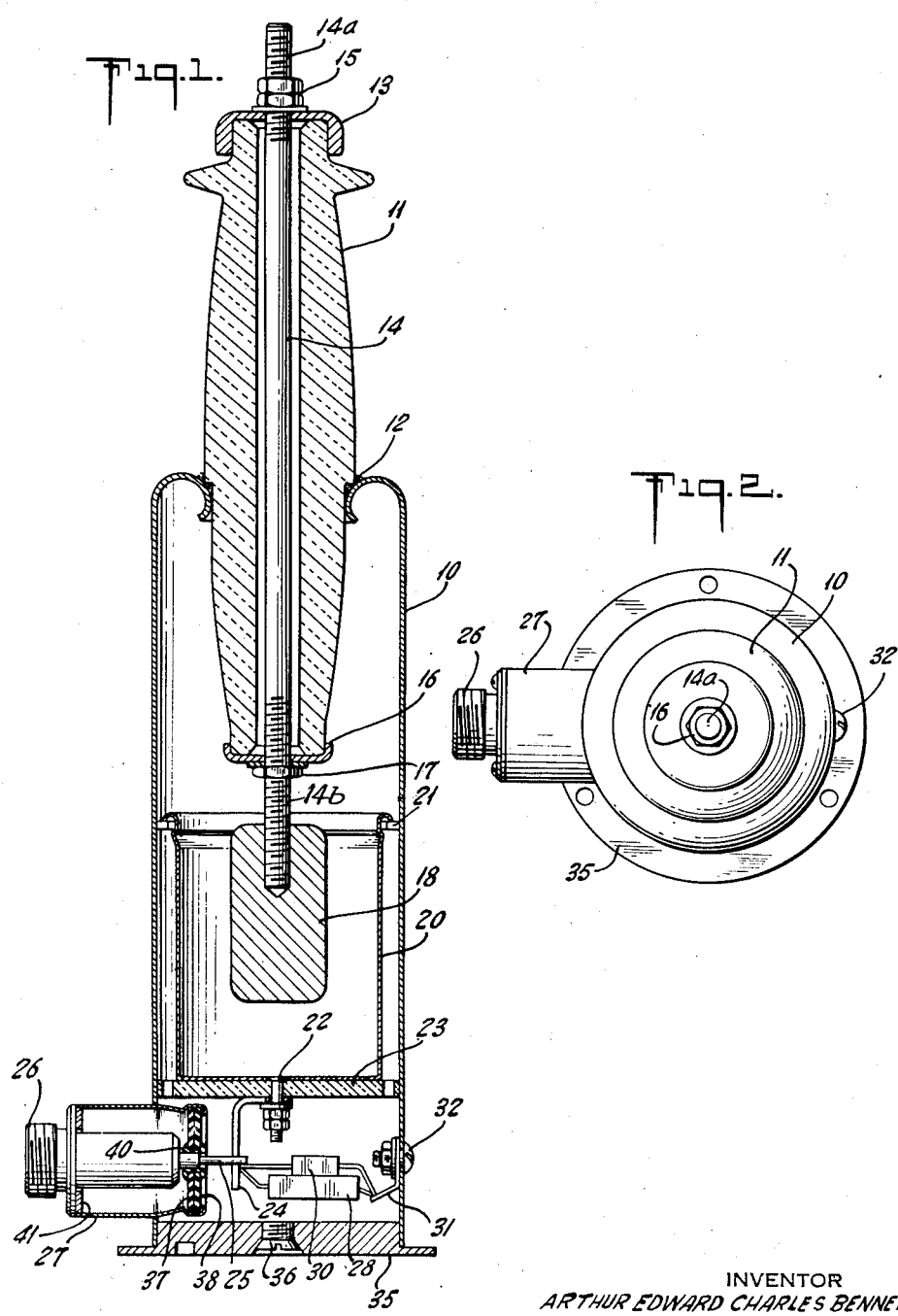
INVENTOR
*ARTHUR EDWARD CHARLES BENNETT*
BY
ATTORNEY Patented June 2, 1953

2,640,940

UNITED STATES PATENT OFFICE 2,640,940

HIGH-FREQUENCY ELECTRIC POTENTIAL DIVIDER

Arthur Edward Charles Bennett, Kenton, England, assignor to Cornell-Dubilier Electric Corporation, South Plainfield, N. J., a corporation of Delaware Application March 12, 1952, Serial No. 276,139
In Great Britain March 14, 1951

9 Claims. (Cl. 307—109)

The present invention relates to an electric potential divider suitable for high voltage high-frequency use, for example in pulse radar equipment for obtaining a known fraction of a high voltage for measurement or control and other purposes. More specifically, the invention relates to devices of this kind in which the input voltage is applied across two capacitors in series and the output voltage is taken from across one of the capacitors, the ratio of the output voltage to the input voltage being inversely proportional to the ratio of the capacitance of the capacitor from across which the output voltage is taken to the capacitance of the two capacitors in series.

The invention has for its object to provide a capacitor potential divider of the above type which will be of small size and of rugged construction; which will have low inherent inductance and be efficiently screened against disturbing fields; and wherein the input-output voltage ratio will be substantially unaffected by stray capacities.

Other objects of the invention are the provision of a high-frequency high voltage potential divider for supplying a relatively low output voltage from a given input voltage which is both simple in design and economical in manufacture; which will require relatively small space and a minimum of component parts; which can be used in connection with high operating voltages without risk of corona discharge; and which can be manufactured efficiently and expeditiously in quantities with very closely exact capacitance values or voltage ratios.

With these objects in view, the capacitor potential divider according to the invention comprises basically a high voltage capacitor of small capacitance having a fluid dielectric, a low voltage capacitor of relatively large capacitance having a solid dielectric and being connected in series with said high voltage capacitor between two input terminals to which the input voltage is applied, and means whereby the output voltage can be taken from across said low voltage capacitor.

The output voltage may be taken from across the low voltage capacitor through a plug and socket connection having its terminals arranged coaxially with one another and it will usually be convenient to connect a resistor across the low voltage capacitor of a suitable value to match the output circuit or load impedance.

The two capacitors are advantageously mounted within an oil-filled metal container constituting a common connection or potential reference point for the input and output circuits. Such container may conveniently be of cylindrical shape having mounted in one end an insulating bushing through which an input terminal rod leads to one of the electrodes of the high voltage capacitor. The low voltage capacitor may be mounted in the opposite end with its electrodes connected, respectively, to the second electrode of the high voltage capacitor and to the container forming the grounded or low voltage side of the device.

In a preferred practical construction according to the invention, the metal container takes the form of a cylindrical vessel open at its lower end and having a central aperture in the opposite end bounded by an inwardly turned flange. A cylindrical insulating bushing of low loss ceramic material passes through the aperture and is sealed therein by soldering to provide a mechanically strong and hermetic joint. A screw-threaded rod constituting the high voltage input terminal or conductor passes through the bushing and is sealed therein by suitable gaskets and clamping nuts, as described in detail hereafter. A mica disc fitting fairly closely within the container may serve to hold the rod and bushing in the central position during the soldering operation.

One electrode of the high voltage capacitor may be in the form of a round nut or cylindrical plug screwed onto the projecting inner end of the input terminal rod, the exact position of the electrode thus being variable by screwing it further or less far on the rod, to thereby adjust the capacitance of the high voltage capacitor.

The other electrode of the high voltage capacitor is advantageously of cylindrical shape concentrically supported to enclose the first electrode and insulatingly mounted in the housing or metal container in any suitable manner, said container being filled with oil or an equivalent insulating compound, to give both the required capacity between said electrodes and to withstand the required operating voltage. It will be appreciated that the adjustment of the spacing between the two electrodes may be effected by adjustably mounting either or both high voltage electrodes, to afford a close control of the capacity therebetween.

The low voltage capacitor is mounted within the open end of the container behind a perforated insulating disc or separating wall which may support the second electrode of the high voltage condenser. This capacitor is of a type suitable for high frequency use and has a solid dielectric, for example of mica or ceramic, the capacitor being advantageously enclosed in moulded insulating material from the ends of which terminal leads or tags project in the well-known manner. One of these terminal tags is bolted to the container wall, while the other is connected to the second electrode of the high voltage condenser. A matching resistor may be shunted across this capacitor of a suitable size depending on the load or output device to be connected thereto.

The wall of the container adjacent to the low voltage capacitor may be provided with an aperture in which is hermetically secured a metal cylinder, supporting a two-part coaxial terminal socket for connection of a concentric cable to the low voltage capacitor of the potential divider.

The open end of the container may be closed by a disc-shaped metal cap or closure member sealed to the container walls by soldering, the cap having a flange extending beyond the container walls by means of which the unit can be attached to any desired mounting. This cap has a central hole through which the interior of the container can be filled with a low loss dielectric fluid, for example a mineral oil, the filling hole afterwards being closed by a screw plug sealed to the cap by soldering.

In use, the input voltage is applied between the input terminal rod and the metal container being at ground potential. The low voltage capacitor is thus connected in series with the high voltage capacitor between the grounded container and the input terminal rod. The output voltage may be taken from the coaxial socket terminal, that is from across the low voltage capacitor shunted by the resistor, by means of a co-operating coaxial plug on the end of a concentric cable. The parts are so dimensioned and adjusted that the output voltage will accurately reproduce the desired fraction of the input voltage, and it will be clear that the grounded container constitutes an effective screen for the whole unit in such a manner that any stray capacitance from the high voltage electrode or connections made thereto will appear across the two capacitors in series and will not, therefore, affect the voltage-dividing ratio.

The invention will be better understood to the following detailed description, considered in conjunction with the accompanying drawing, forming part of the specification, and wherein:

Figure 1 is a vertical cross-section through a potential divider construction embodying the principles of the invention; and Figure 2 is a top view of the device shown in Figure 1.

Referring to the drawing, the numeral 10 represents the outer containing tube of tinned brass spun over at the top where the porcelain bushing 11 through which passes the terminal conductor 14 is solder sealed into position, as shown at 12. The top end of the container 10 is spun over into a smooth curve so as to act as a corona shield for the insulator and to assist in this it is curved on the inside as indicated, to lessen the stress on the porcelain at what otherwise would be the sharp edge of the metal.

The outside end of the bushing 11 is fitted with a metal cap 13 to which is secured the outer threaded end 14a of the terminal conductor 14 by means of a pair of terminal clamping nuts 15. The lower end cap 16 of the bushing supports the lower threaded portion 14b of the conductor 14 secured to the bushing by a further clamping nut 17. To the end of the projecting portion 14b of the terminal conductor there is in turn secured a metal plug 18 forming an electrode of the high voltage capacitor of the potential divider. For this purpose, the plug 18, in the example shown, is tapped to receive the threaded end 14b of the conductor, whereby the position of the plug 18 can be varied in height over a limited range.

The cooperating or low-potential electrode of the high voltage capacitor element is marked 20 and, in the example shown, takes the form of a hollow metal cup concentrically surrounding the electrode 18 and being spaced therefrom at a sufficient distance, to withstand the working voltage of the potential divider with an adequate factor of safety against flash over and to provide a desired capacitance between the electrodes 18 and 20. The outer edge of the cup 20 is spun over into a smooth rim to reduce the electric stress at the edge of the electrode. This spun over edge rests on an insulating disc or support 21 which has a tight fit in the container 10 so as to locate the cup or electrode 20 rigidly into position and to insulate it from the outer container 10. The cup is furthermore supported at its bottom by means of a screw 22 passing through an opening in a further transverse insulating disc or separating wall of ceramic material or the like 23 which is secured in place in the outer container. The screw 22 also forms the electrical connecting means to the cup electrode 20 and has attached to it by clamping or the like a wire 24 to which is soldered the tag 25 projecting from the screened concentric socket 26 which is enclosed within the outer shroud or side tube 27 of the container or housing 10.

Connected to the same junction of 24 and 25 is one of the leads of the bottom end capacitor of the potential divider which may be in the form of a mica condenser element 28. This condenser is shunted by a matching resistor 30, the ground or low potential ends of these two components being connected together to the tag 31 and secured to the terminal screw 32 which passes through the side wall of the outer container and is connected thereto by soldering to provide an oil-tight seal.

The lower end or closure of the outer container 10 is secured to the base plate 35 by any convenient means, including soldering thereto in order to make an oil-tight seal. For this purpose, a ceramic disc may be used as a closure having a metallized surface, as is customary in making soldered connections of this type. In the center of the metal base 25 is the screwed plug 36 through which the interior of the device is filled with oil after assembly. Small holes are left in the periphery of and through the insulating discs 21 and 23 in order to permit the oil to pass through them to fill the whole of the container. The filling of the container is preferably made by the application of vacuum or exhausting the same prior to the introduction of the oil or equivalent insulating compound, to insure that no air pocket is left in the interior beyond sufficient space at the top of the oil to prevent bursting of the seals by expansion of the oil when the temperature is raised.

In order to insure an oil-tight seal for the concentric terminal plug arrangement, for which a normal standard type of concentric cable plug may be used having either a polythene or polytetrafluorethylene or the like insulation which is not in itself oil tight, the concentric plug itself is mounted within the side tube 27 which is sealed against oil leakage by the discs 37 and 38, preferably consisting of a disc of neoprene or of silicone rubber 38 backed by a disc of Bakelite or other convenient rigid insulating material to provide mechanical support for the rubber. The rigid disc 37 is supported by an indentation in the tube 27, while the edge of the tube is spun over into the surface of the resilient disc 38.

In the center of this assembly an eyelet 40 is spun over through the two discs 37 and 38 so as to make a seal into the surface of the resilient disc. The connecting wire 25 to the center of the concentric plug is soldered to the outer end of this eyelet 40. The disc 41 of metal provides an electrical connection between the outer shield of the concentric plug socket and the tube 27 which is solder sealed into and, therefore, electrically connected to the casing 10. This disc 41 is secured in place in the tube 27 by means of screws or in any other suitable manner.

In a potential divider which has been constructed according to this arrangement the working voltage has been up to 15 kv. peak with a ratio of the order of 50:1 between the applied high voltage and the low voltage output. The low voltage is, therefore, under these conditions reduced to a maximum of 300 volts. This is a safe voltage to apply to the single section mica dielectric capacitor forming the lower end of the potential divider. The bulk of the voltage, therefore, occurs across the small capacitance between the electrode 18 and the oil filled cup 20 through the oil dielectric between these two electrodes. This capacitance has been made of the order of 8 to 10 mmfd., the capacitance of the mica condenser unit being of the order of 400–500 mmfd. depending upon individual conditions and requirements.

With a construction of a high-frequency high-voltage potential divider as described, the stray capacitance between the high voltage terminal and the grounded casing through the porcelain bushing is completely across the complete potential-divider and does not affect its voltage ratio. The capacitance through the oil between the outside of the cup 20 and the earthed outer casing 10 adds directly to the capacitance of the mica capacitor 28 and electrically may be regarded as forming part of that capacitance.

There is thus provided by the invention a construction of a high-frequency high-voltage potential divider the high voltage element of which is relatively easy to construct in a reliable manner with the fluid dielectric to give the required capacitance for the high voltage without any risk of corona being formed, since with the fluid dielectric voids can be eliminated more easily than with solid dielectrics. Since the capacitance depends substantially upon the mechanical dimensions of the two electrodes, it is advantageous and practical to construct a large number of these potential dividers with very closely exact capacitance values. With a solid dielectric element for this device, it is not easy to obtain reliable operation without the occurrence of internal corona discharges, unless the capacitance is divided up into a large number of series-connected sections. To do this would require much larger space and would be much more costly to obtain equivalent electrical efficiency of operation.

In the foregoing the invention has been described with reference to a specific illustrative device. It will be evident, however, that numerous variations and modifications, as well as the substitution of equivalent parts and steps for those disclosed herein for illustration, may be made without departing from the broader spirit and scope of the invention, as set forth in the appended claims. The specification and drawing are accordingly to be regarded in an illustrative rather than in a restrictive sense.

I claim:

1. A high-frequency high voltage potential divider comprising a hermetically sealed metallic container filled with a liquid insulating material, a pair of spaced electrodes within said container to provide a high voltage capacitor section, high voltage terminal means insulatingly passing through said container and connected to one of said electrodes, a solid-dielectric low voltage capacitor section in said container having one terminal connected to the other of said electrodes and having its opposite terminal connected to said casing, and low voltage terminal means insulatingly passing through said container and connected to the junction between said high voltage and low voltage capacitor sections.

2. A high-frequency high voltage potential divider comprising a hermetically sealed metallic container filled with a liquid insulating material, a pair of spaced electrodes within said container forming a high voltage capacitor section with said insulating material as a dielectric, high voltage terminal means connected to one of said electrodes and insulatingly passing through said container, a hermetically sealed solid-dielectric low voltage capacitor section in said container having one terminal connected to the other of said electrodes and having its opposite terminal connected to said container, and low voltage terminal means insulatingly passing through said container and connected to the junction between said high voltage and low voltage capacitor sections.

3. A high-frequency high voltage potential divider comprising a hermetically sealed metallic container filled with a liquid insulating material, a pair of spaced electrodes within said container forming a high voltage capacitor section with said insulating material as a dielectric, high voltage terminal means connected to one of said electrodes and insulatingly passing through said container, a solid-dielectric low voltage capacitor section within said casing having one terminal connected to the other of said electrodes and having its opposite terminal connected to said casing, a resistor mounted in said container and electrically connected across said low voltage capacitor section, and low voltage terminal means insulatingly passing through said container and connected to the junction between said high voltage and low voltage capacitor sections.

4. A high-frequency high voltage potential divider comprising a cylindrical metallic container filled with a liquid insulating material, a high voltage insulator hermatically mounted in one end of said container, a pair of spaced concentric cylindrical inner and outer electrodes adjacent to said insulator to form a high voltage capacitor section with said insulating material as a dielectric, a high voltage terminal conductor passing through said insulator and connected to said inner electrode, a solid-dielectric low voltage capacitor section mounted adjacent to the opposite end of said container having one terminal connected to said outer electrode and having its opposite terminal connected to said casing, and low voltage terminal means insulatingly passing through said container and connected to the junction between said high voltage and low voltage capacitor sections.

5. A high-frequency high voltage potential divider comprising a cylindrical metallic container filled with a liquid insulating material, a high voltage insulator mounted in one end of said container, a pair of spaced cylindrical inner and outer electrodes concentrically mounted within said container adjacent to said insulator to form a low voltage capacitor section with said insulating material as a dielectric, a high voltage terminal conductor passing through said insulator and connected to said inner electrode, a sealed solid-dielectric low voltage capacitor section mounted within said container adjacent to the opposite end thereof and having one terminal connected to said other electrode and having its opposite terminal connected to said container, an ohmic resistor in said casing electrically connected across said low voltage capacitor section, and low voltage terminal means insulatingly passing through said container and connected to the junction between said high voltage and low voltage capacitor sections.

6. A high-frequency high voltage potential divider comprising a cylindrical metallic container filled with a liquid insulating material, a high voltage insulator mounted in one end of said container, a cup-shaped outer and cylindrical inner electrode concentrically mounted within said container adjacent to said insulator to form a high voltage capacitor section with said insulating material as a dielectric, a high voltage terminal conductor passing through said insulator and connected to said cylindrical electrode, a sealed solid-dielectric low voltage capacitor section mounted within said casing adjacent to the opposite end thereof and having one terminal connected to said cup-shaped electrode and having its opposite terminal connected to said casing, and low voltage terminal means insulatingly passing through said container and connected to the junction between said high voltage and low voltage capacitor sections.

7. A high-frequency high voltage potential divider comprising a hermetically sealed metallic container filled with a liquid insulating material, a pair of spaced electrodes within said container forming a high voltage capacitor with said insulating material as a dielectric, high voltage terminal means insulatingly passing through said container and connected to one of said electrodes, a low voltage capacitor mounted in a molded insulating casing mounted within said container, means to connect one terminal of said low voltage capacitor to the other of said electrodes and to connect the opposite terminal of said low voltage capacitor to said container, and low voltage terminal means passing through said container and connected to the junction between said low voltage and high voltage capacitors.

8. A high-frequency high voltage potential divider comprising a cylindrical metal container having a perforated insulating dividing wall to provide high voltage and low voltage compartments filled with a liquid insulating material, a high voltage insulator hermetically mounted in one end of said container, a pair of spaced electrodes mounted within said high voltage compartment adjacent to said insulator to form a high voltage capacitor with said insulating material as a dielectric, a high voltage terminal conductor passing through said insulator and connected to one of said electrodes, a sealed solid-dielectric low voltage capacitor mounted in said low voltage compartment having one terminal connected to the other of said electrodes through said separating wall and having its opposite terminal connected to said container, and low voltage terminal means insulatingly passing through said low voltage compartment and connected to the junction between said high voltage and low voltage capacitors.

9. In a high-frequency high voltage potential divider comprising a sealed cylindrical metallic container having a perforated insulating dividing wall to provide high voltage and low voltage compartments filled with a liquid insulating material, a pair of concentric cylindrical electrodes mounted in said high voltage compartment to form a high voltage capacitor with said insulating material as a dielectric, a high voltage insulator hermetically mounted in said high voltage compartment, a high voltage terminal conductor passing through said insulator and connected to the inner of said electrodes, a sealed solid-dielectric low voltage capacitor mounted in said low voltage compartment having one terminal connected to said outer electrode and having its opposite terminal connected to said container, and low voltage terminal means insulatingly mounted in said low voltage compartment and connected to the junction between said high voltage and low voltage capacitors.

ARTHUR EDWARD CHARLES BENNETT.

References Cited in the file of this patent

UNITED STATES PATENTS

| Number | Name | Date |
|---|---|---|
| 2,004,954 | Langguth | June 18, 1935 |
| 2,005,147 | Langguth et al. | June 18, 1935 |